United States Patent [19]
Lyachovitsky

[11] Patent Number: 6,079,303
[45] Date of Patent: Jun. 27, 2000

[54] AUTOMATIC ADJUSTABLE POWER CHUCK SYSTEM AND METHOD

[75] Inventor: Naum Lyachovitsky, Moshav Elazar, Israel

[73] Assignee: N. T. Naum Technologies Ltd., Neve Dekalim, Israel

[21] Appl. No.: 09/280,817

[22] Filed: Mar. 30, 1999

Related U.S. Application Data

[60] Provisional application No. 60/080,573, Apr. 3, 1998.

[51] Int. Cl.[7] ....................................................... B23B 31/12
[52] U.S. Cl. ................................. 82/165; 82/167; 82/168; 279/114
[58] Field of Search .............................. 82/165, 164, 162, 82/166, 167, 168, 170, 118, 47; 279/7, 114, 126

[56] References Cited

U.S. PATENT DOCUMENTS

| | | | |
|---|---|---|---|
| 2,528,442 | 10/1950 | Leifer | 270/114 X |
| 3,499,657 | 3/1970 | Giraud et al. | 279/114 |
| 4,359,676 | 11/1982 | Fujioka | 82/118 X |
| 4,386,544 | 6/1983 | Fuminire | 82/165 X |
| 5,894,771 | 4/1999 | Braun et al. | 82/47 |

*Primary Examiner*—Henry W. H. Tsai
*Attorney, Agent, or Firm*—Edward Langer

[57] ABSTRACT

A power chuck system is disclosed featuring a motor, a harmonic drive and a chuck. The harmonic drive is arranged with an input member driven by direct connection with the motor rotor, and an output member directly connected to a long stroke jaw actuation device, providing an integral unit which rotates together with the spindle during machining. During jaw adjustment, an electromagnetic brake releasably connects the motor stator with the spindle and chuck body. Gripping force adjustment is achieved by adjusting the motor torque. The inertial forces of the rotating components are overcome by controlling the motor torque and velocity as gripping ensues, and therefore both high and low gripping forces may be accurately achieved with high speed jaw adjustment. Jaw position and workpiece diameter measurement with a feedback capability are made by use of a rotary encoder.

22 Claims, 12 Drawing Sheets

AUTOMATIC ADJUSTABLE POWER CHUCK SYSTEM AND METHOD

This application claims benefit of Provisional Appl. 60/080,573 filed Apr. 3, 1998.

FIELD OF THE INVENTION

The present invention relates to machining apparatus and accessories for lathes and other machine tool equipment, and more particularly, to an automatic, adjustable power chuck having adjustable jaw grips providing adjustable gripping force, for gripping a workpiece mounted for machining on a lathe or other machine tool, such as a grinding machine. The inventive chuck is configured to enable measurement of the workpiece diameter.

BACKGROUND OF THE INVENTION

There are three types of workpiece-gripping chucks available in the market today, and these are classified according to their method of opening and closing as hydraulic, pneumatic and mechanical. The hydraulic and pneumatic types are automatic, and the mechanical type is manually-operated. The hydraulic and pneumatic types are limited by the range of the workpiece diameter that may be mounted for machining with the selected jaw settings. If this range is exceeded, the lathe operation must be disrupted in order to manually change the jaw setting. The hydraulic type requires a hydraulic station and a power unit for each chuck, whereas the pneumatic type may use a central pneumatic station for all chucks used in the factory and a separate power unit for each chuck. The hydraulic chuck provides a higher maximum gripping force than a pneumatic chuck. The gripping force is changed by adjusting the pressure of the oil or air, respectively.

Mechanical chucks that are available in the market today are not automatic, and the operator must exert his own energy to open and close the chucks by means of an Allen wrench. Therefore the replacement of the workpiece takes longer than with the automatic types. Electromechanical power chucks have been developed. These chuck types are typically characterized as having a bulky construction.

Prior art power chuck apparatus has been disclosed in U.S. Pat. Nos. 4,951,535 and 4,758,006 to Hiestand. In the first patent, an adjustment member is used to actuate the clamping jaws of a chuck, with the adjustment member being rotationally driven by a motor and reduction gear mechanism not in-line with the spindle. In the second patent, an adjusting drive mechanism is provided for adjusting the clamping jaws, and is connected via a set of pulleys rotationally driven off the main spindle, again not in-line with it. This construction makes for a bulky arrangement, requiring much space. In one embodiment the adjusting drive mechanism is mounted within the lathe headstock, and the mechanism will consequently become contaminated by the presence of chips resulting from the machining process.

In PCT Patent application W094/14559 by Voisard, a scroll-type automatic chuck is disclosed using a vane motor operating under compressed air. The scroll-type chuck has a spiral crown which engages the teeth of the clamping jaws, so that rotation of the crown by means of the vane motor adjusts the jaw position. The construction uses a planetary gear which adds to the moment of inertia of the mechanism, making it heavier and less well-balanced. A high speed motor with a high torque is used. Since the preferred embodiment employs a gear ratio of 75, as specified in the application, high inertial forces are induced.

The aforementioned prior art power chucks do not take into account the additional gripping force that results from the inertial forces of the adjustment mechanism. Since the adjustment member rotates at a high velocity to achieve rapid jaw position adjustment, the abrupt change in velocity during which the workpiece is grasped within a split second produces deceleration of the adjustment member. Consequently high inertial forces are produced relative to the gripping force. Workpieces which require low gripping forces may be damaged if necessary precautions are not taken for the inertial forces, and it becomes impossible to achieve a low gripping force coupled with rapid jaw position adjustment.

The bulky construction associated with the prior art chuck designs makes them less desirable in many machine tool applications where space is at a premium. Therefore, it would be desirable to provide a compact, automatic power chuck with an adjustable gripping force, with rapid jaw position adjustment.

The workpiece diameter is an important measurement in automatic machining, since it determines whether the selected workpiece conforms to the machining program, and determines whether the workpiece was inserted in the correct position, i.e., whether the axis of the grasped workpiece is concentric and parallel to the axis of the lathe spindle. Currently, no accurate mechanism has been developed to measure the workpiece diameter and to provide feedback concerning the size and position of the workpiece. Information to confirm the correct workpiece and its position is beneficial to avoid costly damage to the cutting tool, the workpiece itself, and even to the lathe during machining steps.

Therefore, it would be desirable to provide information regarding the workpiece diameter measurement based on the operation of the automatic power chuck.

SUMMARY OF THE INVENTION

Accordingly, it would be desirable to overcome the disadvantages associated with prior art automatic chuck designs and provide an automatic power chuck featuring a compact and simply designed chuck with a variable gripping force and a high speed and long stroke jaw adjustment with a feedback capability.

In accordance with a preferred embodiment of the present invention, there is provided an automatic power chuck system, operable in machining and jaw adjustment modes for use in gripping a workpiece on a machine tool spindle, said system comprising:

a power chuck having clamping jaws for gripping the workpiece in adjustable fashion with adjustable gripping force, said clamping jaws being being capable of grasping a workpiece and being adjustably mounted and radially displaceable in a chuck body;

a set of teeth integrally formed with said clamping jaws intermeshing with a clamping jaw actuating means rotatingly mounted in said chuck body, and a rotational power source comprising a stator and rotor for driving said clamping jaw actuating means in the jaw adjustment mode via a gear reduction means having an input and output member, said output member of said gear reduction means engaging said clamping jaw actuating means, said rotor being connected to said input member of said gear reduction means, said stator being connected to the machine tool spindle and said chuck body only during the jaw adjustment mode, wherein said gear reduction means, said clamping jaw actuating means and said rotor form an integral unit and rotate in unison with said machine tool spindle in the machining mode.

In a preferred embodiment, the inventive power chuck is constructed with a harmonic drive providing a simpler construction than prior art designs, with better rotational balance and low inertia. The gripping force is adjusted by rotation of a hollow shaft enclosed within the spindle shaft, so that an in-line construction is achieved, enabling a compact design. A range of gripping forces is provided by a small torque motor which drives the hollow shaft, and the clamping jaws can be rapidly adjusted as needed.

The jaw adjustment is accomplished by the rotation of an Archimedian spiral. The advantage of a chuck provided with an Archimedian spiral is such that the jaw stroke is long and therefore the jaws may grasp a workpiece with any diameter less than the maximum diameter of the chuck.

The Archimedian spiral is rotatingly driven by a harmonic drive speed reducer. The output of the harmonic drive speed reducer is permanently connected to the Archimedian spiral, with a preferred embodiment including a flexible coupling to overcome rotational runout. The chuck housing encloses the harmonic drive speed reducer.

The harmonic drive speed reducer is hollow and is provided with a higher gear ratio and a simpler and more compact construction than prior art designs, with good rotational balance, low weight and a relatively low moment of inertia. A hollow shaft located within the lathe spindle transfers rotational movement from the rotor of the motor to the input of the harmonic drive speed reducer.

A hollow speed reducer having a high gear ratio, high torque rating, low weight and small outer diameter was selected. Because of its small physical characteristics, the harmonic drive speed reducer is able to be situated within the chuck housing and to be directly connected to the Archimedian spiral. Since the speed reducer has a high gear ratio, a hollow motor having a low torque, low weight and high speed can be implemented. A range of gripping forces is provided by adjusting the motor torque.

The combination of a speed reducer having a high gear ratio, high torque rating, low weight and small outer diameter together with a relatively high speed and a relatively low torque motor forms a compact system.

The speed reducer rotates together with the chuck during machining while the chuck does not rotate during jaw adjustment. According to the inventive design, the motor rotor is permanently connected to the input of the speed reducer and during jaw adjustment the rotor transfers torque to the speed reducer. At the instant that the motor rotor transfers rotational movement to the input of the harmonic drive speed reducer, an electromagnetic brake is energized and connects the motor stator with the lathe spindle.

During machining, the rotor, speed reducer, lathe spindle and chuck body rotate in unison as one integral unit without any transfer of torque to the speed reducer. Unlike with prior art designs, in which a separate coupling is used to connect the motor rotor with the speed reducer during jaw adjustment and disconnect them during machining, by virtue of the inventive design no separate coupling is needed to transfer rotational movement between the motor rotor and speed reducer.

The prior art power chucks mentioned in the background have a high weight, bulky and non-compact construction in relation to the inventive chuck. The prior art chucks are incapable of providing simultaneous gripping force control and high speed jaw adjustment. Since the motor velocity drops abruptly during a quick machining operation in which there is a short workpiece gripping time, the rotating components of the prior art chucks have a high angular deceleration and induce a high moment of inertial forces. When the workpiece is grasped the total sum of the gripping force is comprised of the force component of the motor torque and of the inertial forces. The prior art chucks do not take into account the additional gripping force induced by the inertial forces, and therefore they are incapable of controlling the required low gripping force for thin-walled or other workpieces which are highly sensitive to gripping force.

In contrast, the inventive power chuck controls the inertial forces, and therefore it is capable of producing high speed jaw adjustment with both high and low gripping forces.

A feature of the invention is the provision of an encoder mounted on the motor shaft. The encoder has three functions. The first is to constitute an integral component of the motor control system without which the motor will not be controllable. The other two, providing the novelty of the inventive chuck, are to provide an accurate reading of the motor speed and motor rotor position.

The motor speed reading enables control of the inertial forces during the grasping of the workpiece. The reading of the motor rotor position provides control of the jaw position. In this way, the encoder provides an accurate reading of the motor rotor position, enabling the clamping jaws to provide a measurement of the grasping diameter. This is especially useful to determine whether the workpiece is improperly grasped, or there is a foreign particle on the workpiece or an incorrect workpiece was selected, before the machining program commences, so as to avoid damages to the workpiece, the chuck and the machine tool.

Using the encoder to provide a means for electronically measuring the workpiece diameter while being clamped by the chuck jaws, a preferred workpiece machining program can be selected and programmed, without danger to the machine tool and the chuck itself.

Other features and advantages of the invention will become apparent from the drawings and description below.

BRIEF DESCRIPTION OF THE DRAWINGS

For a better understanding of the invention, reference is made to the accompanying drawings, in which like numerals designate corresponding elements or sections throughout, and in which.

DETAILED DESCRIPTION OF THE PREFERRED EMBODIMENTS

Figure 1:
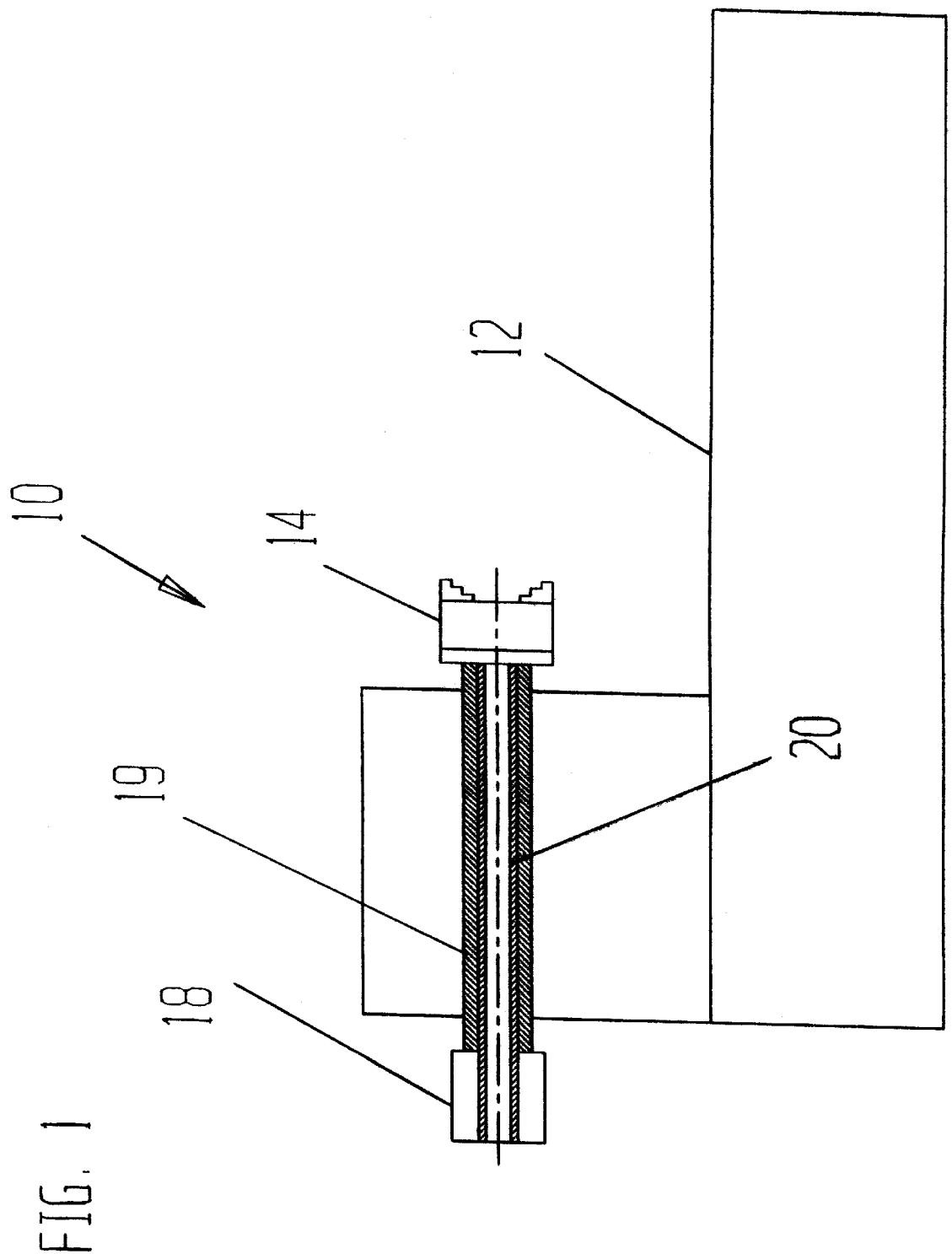
FIG. 1 is an overall schematic diagram of an automatic power chuck arranged in a lathe machine tool, in accordance with the principles of a preferred embodiment of the present invention.

Referring now to FIG. 1, there is shown an overall schematic diagram of an automatic power chuck 10 arranged in a machine tool lathe unit 12, in accordance with the principles of the present invention. The inventive power chuck 10 comprises two units, a chuck unit 14 and power unit 18. Chuck unit 14 is located at one end of lathe spindle 19, and power unit 18 at the other end. A hollow shaft 20 enclosed within spindle 19 transfers rotational movement from power unit 18 to chuck unit 14.

As will be described further herein, the in-line construction by which hollow shaft 20 is driven under torque developed by power unit 18 enables a design featuring a relatively low torque, relatively high speed motor, with an infinitely variable gripping force, for a compact, simplified power chuck.

In order to process long workpieces it is necessary that the entire chuck system be hollow, that is, there is a center-through hole from one end of the chuck unit 14 through the hollow shaft 20 to the power unit 18.

Figure 2:
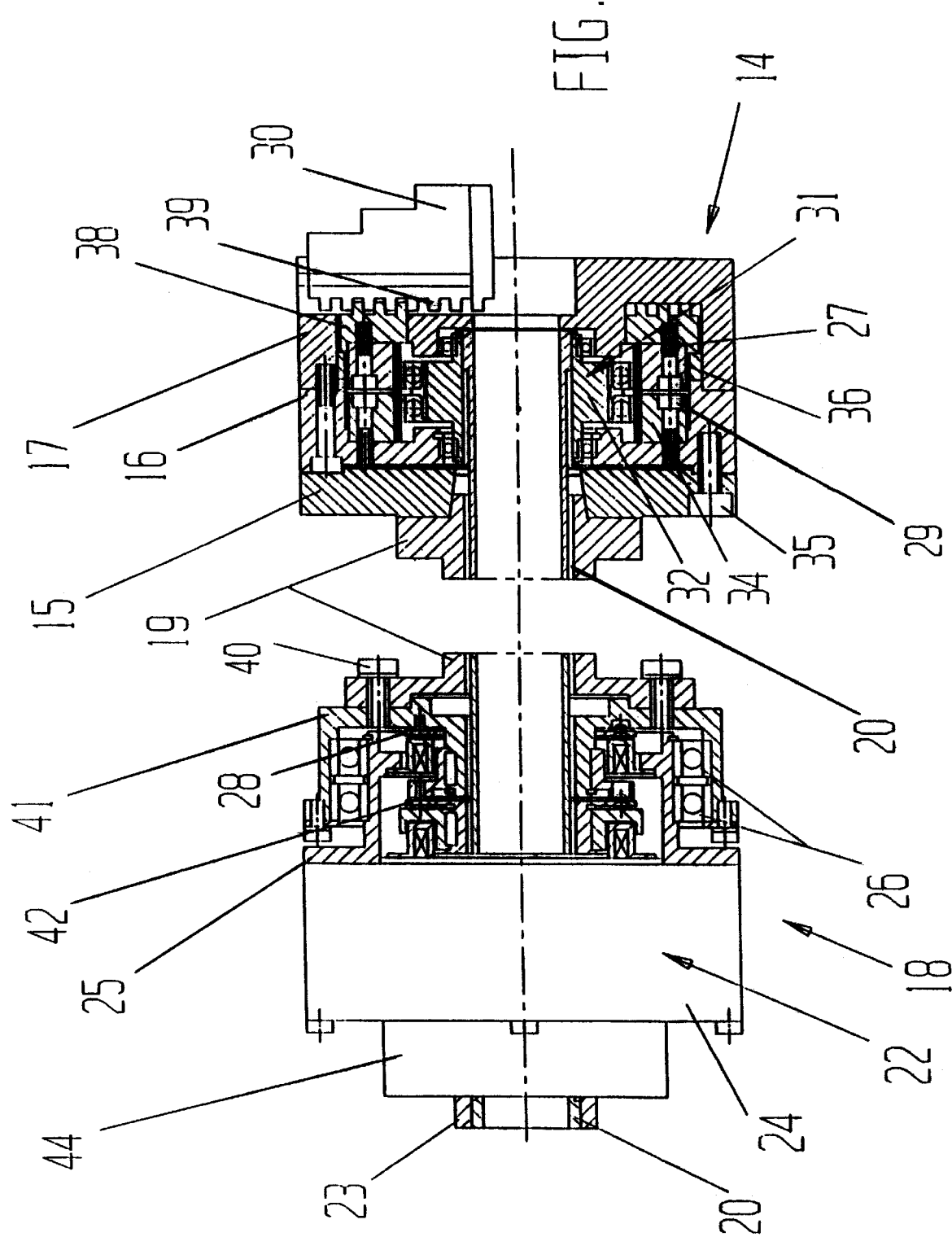
FIG. 2 is a cross-sectional view of the power chuck of FIG. 1.
Figure 3:
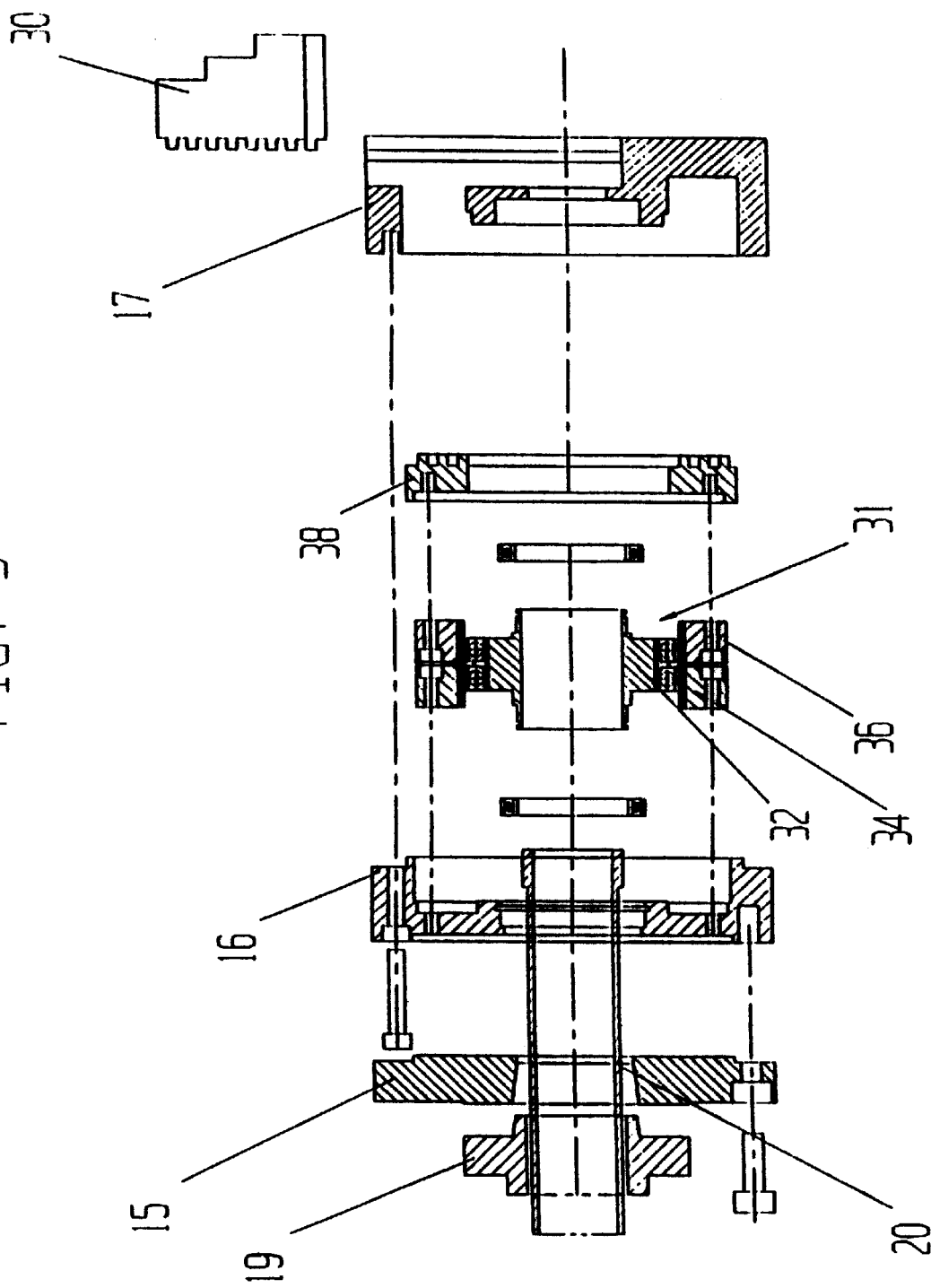
FIG. 3 is an exploded view of the chuck unit.
Figure 4:
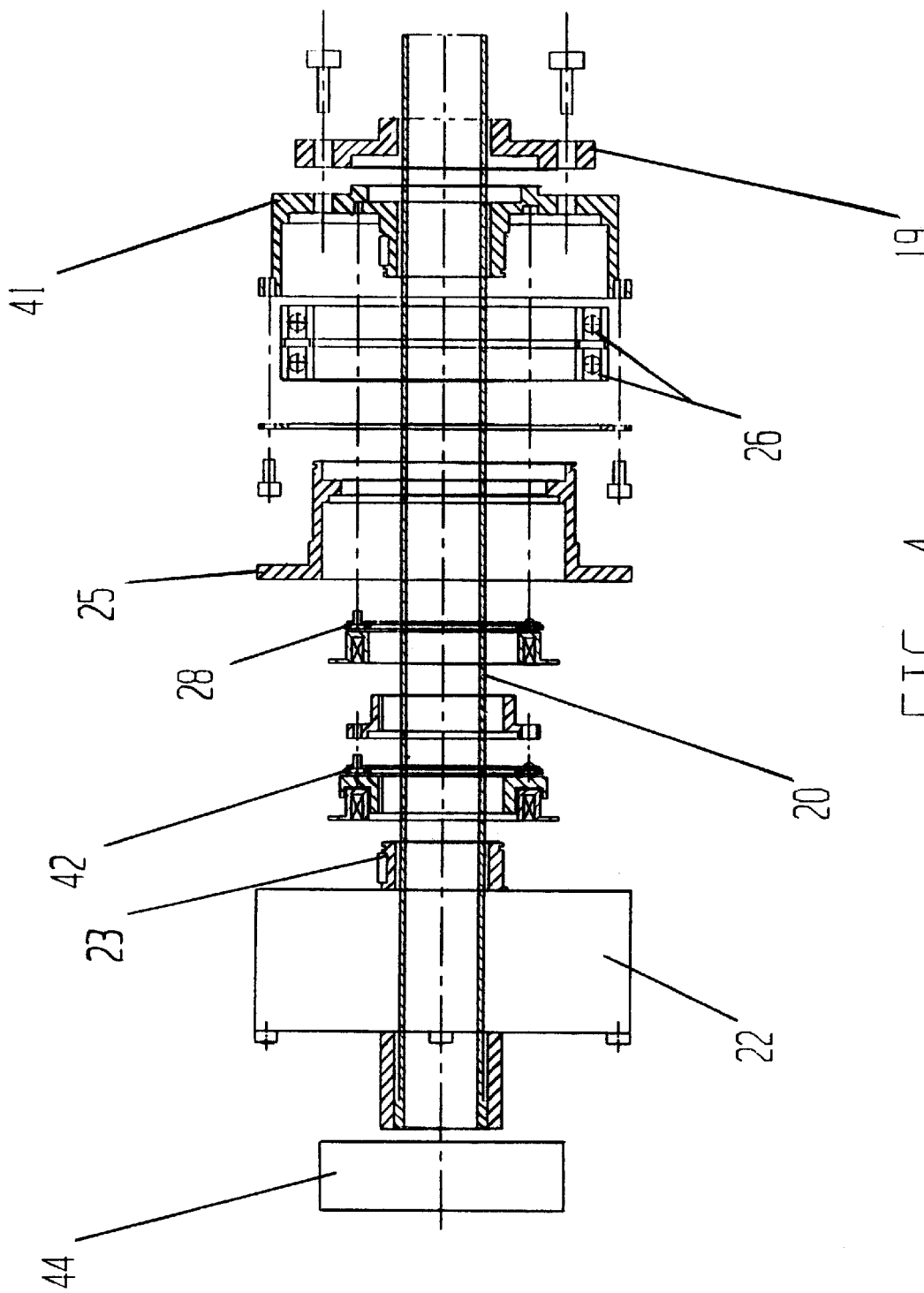
FIG. 4 is an exploded view of the power unit.

As shown in the cross-sectional and exploded views of FIGS. 2–4, the two major components of the inventive chuck are chuck unit 14 and power unit 18. Power unit 18 comprises a hollow electromechanical arrangement featuring an electrical motor 22, comprising a rotor 23 and a stator 24, or any other equivalent rotational power source which drives rotation of hollow shaft 20. Electrical motor stator support 25 is rotatingly supported on lathe spindle 19 by bearing means 26. Electromagnetic brake 28 constitutes a coupling between motor stator support 25 and lathe spindle 19 during jaw adjustment. Electromagnetic clutch 42 constitutes a coupling between motor rotor 23 and lathe spindle 19 during lathe operation. The motor stator 24 is fixedly connected to the lathe unit 12 (not shown) to prevent inadvertent chuck body movement during jaw adjustment.

Figure 9:
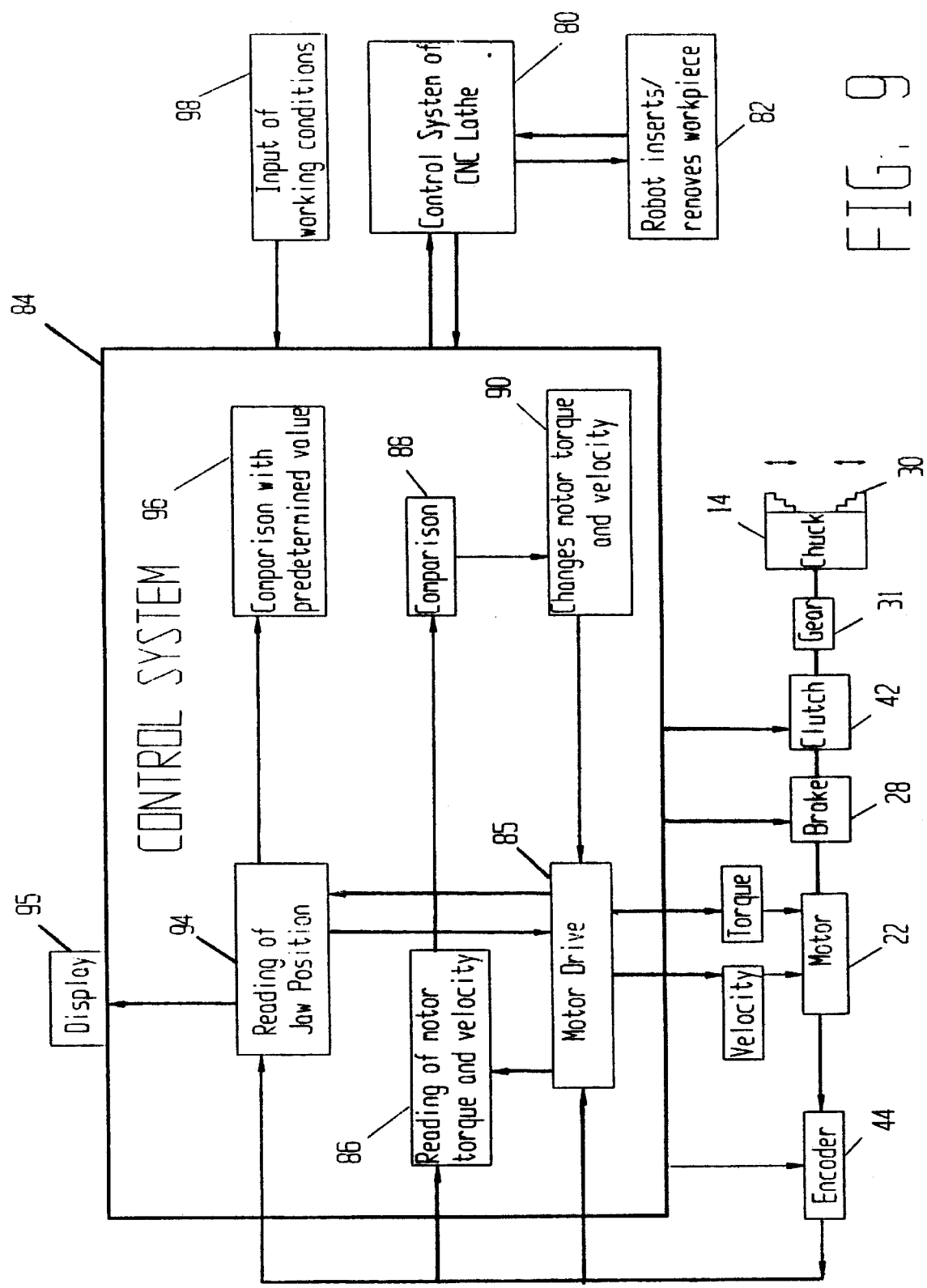
FIG. 9 is a schematic block diagram of the power chuck control system.
Figure 10:
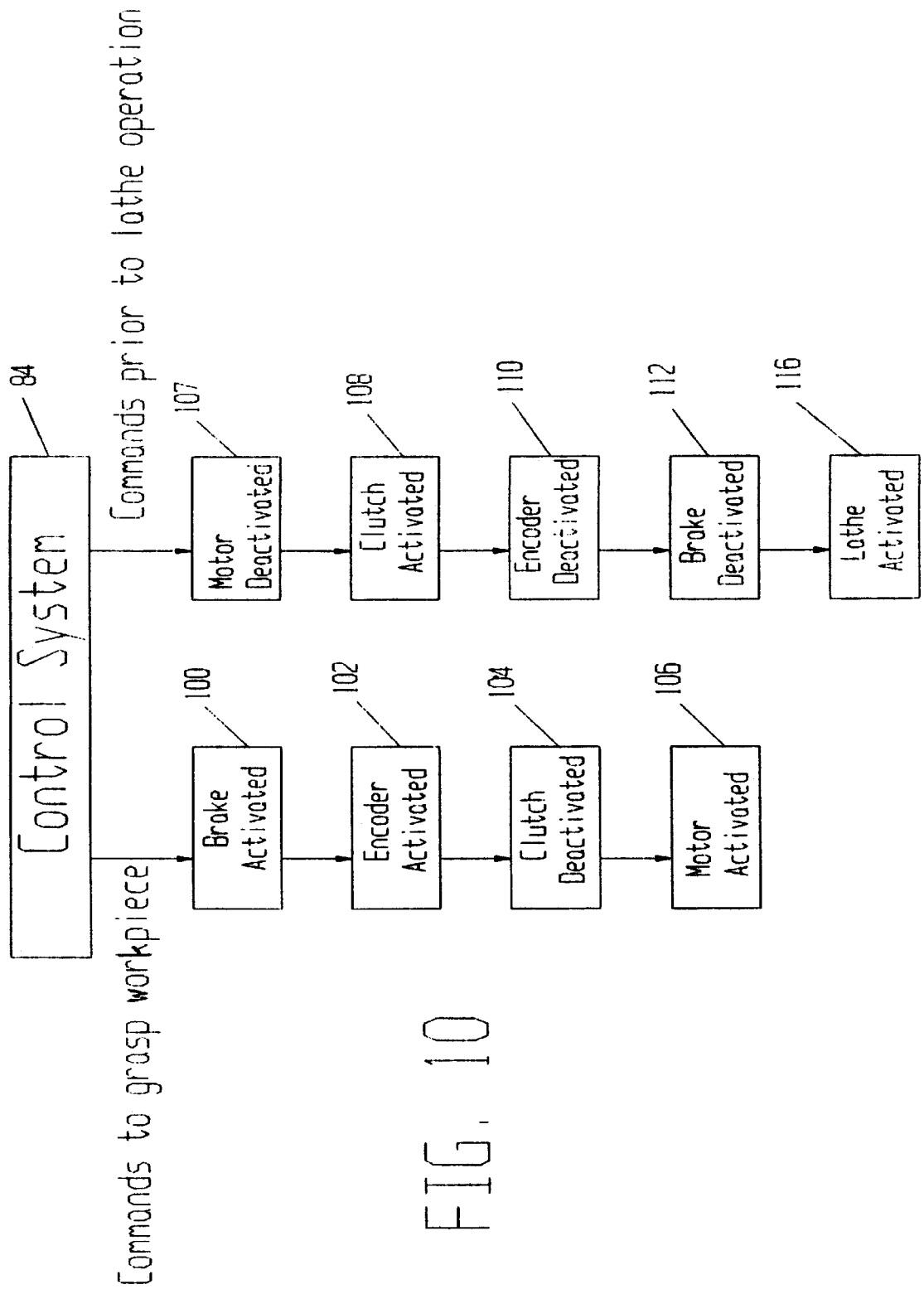
FIG. 10 is an operational schematic diagram of the power chuck in response to a sequence of control system commands.

A control system, described further in connection with FIGS. 9–10, assures that lathe spindle 19 rotation and electrical motor 22 operation do not occur simultaneously. Lathe spindle 19 rotation is powered by a lathe motor (not shown).

Normal motor operation requires that the stator 24, which is permanently connected to motor stator support 25, be fixed in position on lathe spindle 19 while the power is transferred by means of the motor rotor 23, via hollow shaft 20.

The chuck unit 14 construction comprises chuck body sections 16–17, a set of clamping jaws 30, Archimedian spiral 38 and harmonic drive 31, or any other equivalent speed-reducing gearing system which provides a high gear reduction ratio, good rotational balance and low weight while maximizing space utilization. The hollow shaft 20 provides a hollow center into which a long workpiece can be placed, while being gripped by clamping jaws 30. The rotational input member of the harmonic drive 31 is called the wave generator 32, and the harmonic drive 31 is provided with a circular spline 34 which is fixedly connected to chuck body section 16 by screw 29. The harmonic drive also comprises an output member called the dynamic spline 36, which is connected by fastening means 27 to the Archimedian spiral crown 38, rotatingly mounted in chuck body 16–17.

Clamping jaws 30 have teeth 39 which are intermeshed with spiral crown 38. As crown 38 rotates with respect to chuck body 16–17, it engages the teeth 39 of each jaw 30 and causes the jaws to move in unison radially inwards or outwards. The rotational direction and velocity of clamping jaws 30 are dependent on those of the dynamic spline 36. The maximum gripping range of clamping jaws 30 is at the point beyond which there is no complete toothing, i.e. to the outer diameter of the chuck body 16–17.

In operation, when the lathe motor drives lathe spindle 19 rotation during machining activities, motor 22 is de-activated. The motor 22 drives hollow shaft 20 rotation only during the clamping jaw 30 adjustment mode, and the plurality of components of the harmonic drive 31 except for circular spline 34 rotate. Relative motion of the dynamic spline 36 that is connected with Archimedian spiral crown 38 in relation to the circular spline 34 that is connected with chuck body 16–17 enables clamping jaw 30 movement. If dynamic spline 36 and circular spline 34 rotate at the same rate, jaw movement is impossible.

The following table compares the operating characteristics of various types of drives at a gear ratio of 80 and input velocity of 2000 rpm:

|  | gear ratio | weight kg | momentary peak torque Nm | OD mm | ID mm | moment of inertia $-4 \quad 2$ $10 \text{ kgm}$ |
|---|---|---|---|---|---|---|
| Cyclo FC-A45G | 89 | 18 | 1280 | 220 | 38 | 11.9 |
| Akim 2S-R90/2 | 80 | 15 | 1500 | 210 | N/A | 0.58 |
| Harmonic Drive HDUR-45-IH-80 | 80 | 10* | 1270 | 155 | 47 | 13.75 |

*4.4 kg without housing

The harmonic drive speed reducer 31 was selected since it has a lower weight, smaller outer diameter, larger inner diameter, and a simpler construction than the other types. Even though the nominal life expectancy is only 35,000 hours, the drive will be operated only when the jaws are readjusted, approximately a total usage of ½ hour a day, and the longevity of the system is therefore quite high.

The motor 22 design criteria include: center-through hole, herein referred to as a hollow motor, having a compact construction, low weight and moment of inertia, and simple adjustment of motor torque, velocity and rotational direction. A range of gripping forces is provided by adjusting the motor torque. The jaw 30 adjustment time is changed by an adjustment of the motor velocity.

During motion of the clamping jaws 30, the control system ensures that the electromagnetic brake 28 is energized, so that the motor stator support 25 is connected to the power unit housing 41. There is a permanent connection provided by screw 40 between power unit housing 41 and lathe spindle 19. Lathe spindle 19 is permanently connected to chuck adapter 15, while adapter 15 is permanently connected to chuck body section 16 by fastening means 35, and chuck body section 16 is permanently connected to circular spline 34 of the harmonic drive 31 by screw 29. Thus, energization of the electromagnetic brake 28 essentially forms an integral connection between the motor stator support 25 and the circular spline 34.

Another permanent connection exists between motor rotor 23 and wave generator 32, via the hollow shaft 20. The control system activates the motor 22 upon receiving the appropriate signal that the electromagnetic brake 28 has been energized. The operation of the motor 22 results in rotation of the motor rotor 23 and wave generator 32, and likewise in the rotation of the Archimedian spiral crown 38 which is permanently attached to the dynamic spline 36 of the harmonic drive 31. The clamping jaws 30 then translate to a new position. The gripping force adjustment is provided by adjusting the motor 22 torque.

As energy is transferred from the motor 22 to the harmonic drive speed reducer 31, the motor-reducer system must be a closed mechanical loop, i.e. the motor stator 24 must be connected to the reducer housing. Therefore, during jaw adjustment, the motor stator 24 is connected to the lathe spindle by means of hollow electromagnetic brake 28. Since a speed reducer with a high gear ratio and a motor 22 producing a relatively low torque are selected, the electromagnetic brake 28 receives a low moment and the dimensions of the brake 28 are consequently small.

The motor 22 is de-activated when lathe unit 12 is activated at the resumption of the machining operation. Due to the instantaneous transition from the motor operation to the lathe unit 12 operation, or due to a sudden change in the lathe unit 12 operating speed, the harmonic drive 31 may rotate due to rotational inertia. To prevent rotation of the harmonic drive 31 during lathe operation, the following safety feature has been incorporated in the inventive power chuck system 10 design.

During the machining operation of the lathe, wave generator 32 is connected to the lathe spindle 19 by means of electromagnetic clutch 42. Wave generator 32 and circular spline 34 rotate at the same rate, and the dynamic spline 36 is therefore prevented from moving independently of circular spline 34. The electromagnetic clutch 42 connects power unit housing 41, which is permanently connected to the spindle 19, as mentioned above, to the motor rotor 23. Motor rotor 23 is connected to wave generator 32 by means of hollow shaft 20. The lathe spindle 19 is connected to the chuck body 16–17. The electromagnetic brake 28 is de-energized when the jaws 30 cease to translate and the motor stator 24 is detached from the lathe spindle 19. At that time the motor rotor 23 is connected by means of an electromagnetic clutch 42 to the lathe spindle 19 to prevent inadvertent rotational movement which may cause jaw movement.

The control system is arranged so that the electromagnetic clutch 42 is energized at a split second before the electromagnetic brake 28 is de-energized. Consequently, there is no connection between the motor stator support 25 and the lathe spindle 19, and this safety feature enables operation of lathe unit 12 without inadvertent wave generator 32 rotation.

The preferred embodiment also includes a method for determining the exact jaw position. A hollow rotary encoder 44 is provided in the inventive chuck whereby the encoder housing is connected to the motor 22 housing and the rotating component of the encoder is connected to motor rotor 23. Rotary encoder 44 measures the number of rotations or fractions thereof of motor rotor 23. Since there exists a kinematic ratio between motor rotor 23 and clamping jaws 30, measurement of motor rotor 23 rotation is directly related to the position of each clamping jaw 30. The correlation between the rotation of motor rotor 23 and clamping jaw 30 movement is based on the gear ratio of the harmonic drive 31 and the thread height between each spiral of spiral crown 38. Thus, a reading of encoder 44 will essentially indicate the position of each jaw 30 and consequently the workpiece diameter can be displayed as it is grasped.

The inventive power chuck may be implemented by use of skill of the art mechanical design techniques in which the following parts may be used for construction of a preferred embodiment:

Harmonic Drive (31)—Harmonic Drive Systems (Tokyo), Model HDUR-45-80-IH-SP

Electromechanical Motor (22)—Kollmorgen (Viginia), Model RBE-0310-F

Chuck-Rohm (Germany), Model 306-00 ZG Hi-tru

Rotary Encoder (44)—Heidenhain (Germany), Model ERN-120

Electromagnetic Clutch (42)—Warner (Germany), Model Em3-Gbo-E221

Electromagnetic Brake (28)—HPC (UK), Model 02110

An alternate embodiment of the inventive power chuck can be implemented using a jaw actuation means comprised of a screw system in which a rotating screw engages the teeth 39 of the clamping jaws 30. Such a chuck is obtainable from Mundorf of Radevornwald, Germany, and its use increases the maximum obtainable gripping force.

Figure 5:
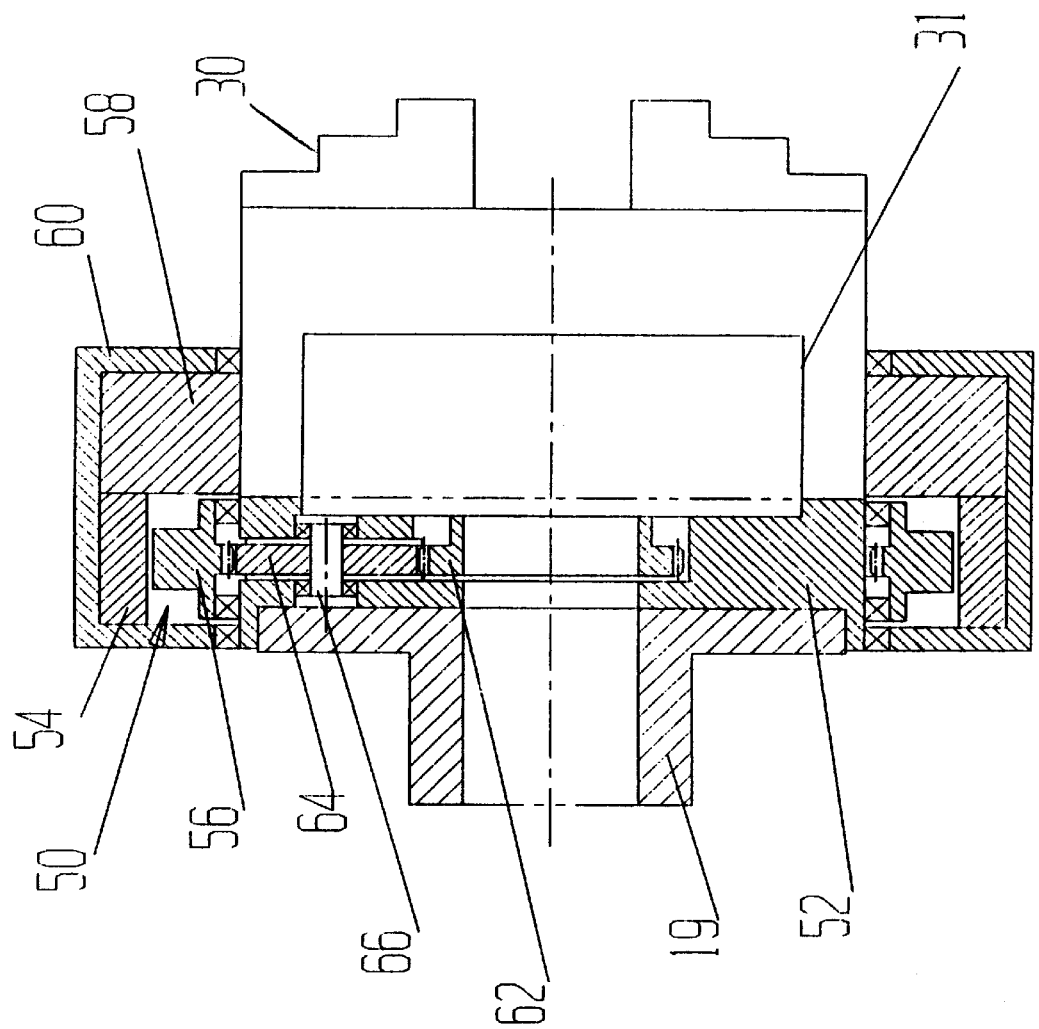
FIG. 5 is a schematic in partial cross-sectional view of an embodiment of the inventive power chuck in which there is no separate power unit and in which the motor rotor rotates in unison with the chuck body whereas the motor stator does not rotate in unison with the chuck body.

Another embodiment is shown in FIG. 5 in which there is no hollow shaft and no separate power unit 18. In this embodiment, hollow motor 50 is designed to encompass the chuck body 52, and comprises motor stator 54 and motor rotor 56. Motor 50 and electromagnetic brake 58 are disposed within stationary ring 60. Motor stator 54 is permanently connected to stationary ring 60. Toothed motor rotor 56 is drivingly and permanently connected to harmonic drive 31 by means of gear wheels 62 and 64. Gear wheel 62 is attached to wave generator 32 of harmonic drive 31 (not shown). Three gear wheels 64 are rotatingly supported on chuck body 52 by means of axle 66.

During the jaw adjustment mode, motor stator 54 and stationary ring 60 are attached to chuck body 52 by means of electromagnetic brake 58 to form a closed mechanical loop. Motor 50 is activated and therefore motor rotor 56 rotates, driving gear wheels 62 and 64 in addition to wave generator 32 of harmonic drive 31 (not shown). During the machining mode, chuck body 52 rotates together with harmonic drive 31, gear wheels 62 and 64, and rotor 56. Motor stator 54 and stationary ring 60 will not rotate since they are detached from chuck body 52 by means of electromagnetic brake 58.

Figure 6:
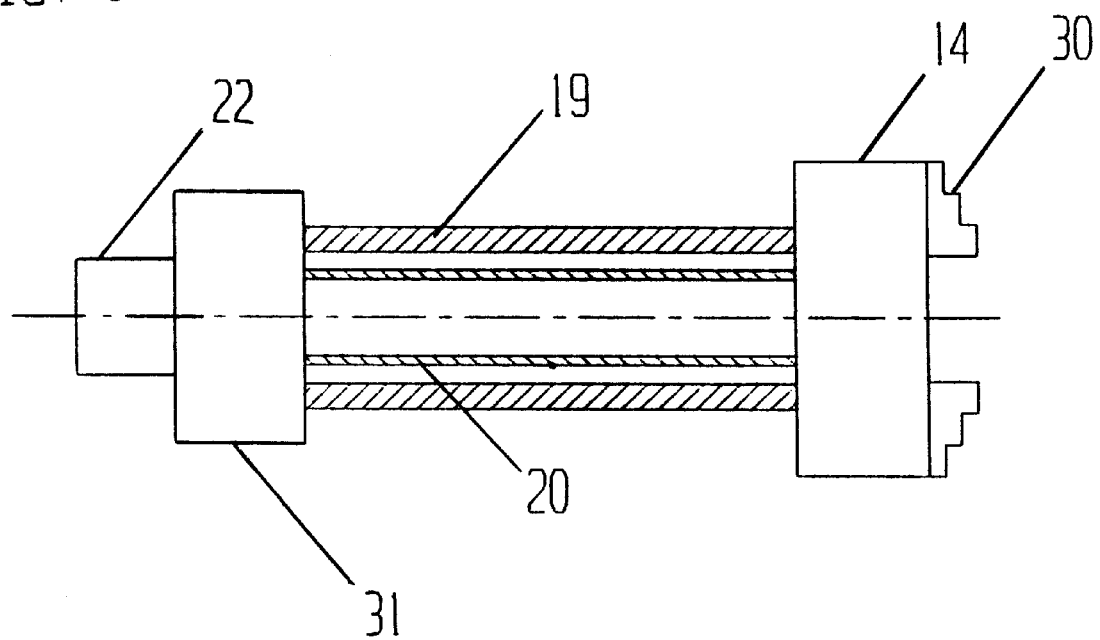
FIG. 6 is a schematic of an embodiment of the inventive power chuck in which the reduction gear is disposed externally to the chuck body.

In FIG. 6, another embodiment is shown in which reduction gear 31 is disposed outside of chuck unit 14. This embodiment is useful for chucks in which a chuck body having a short length is needed.

Figure 7:
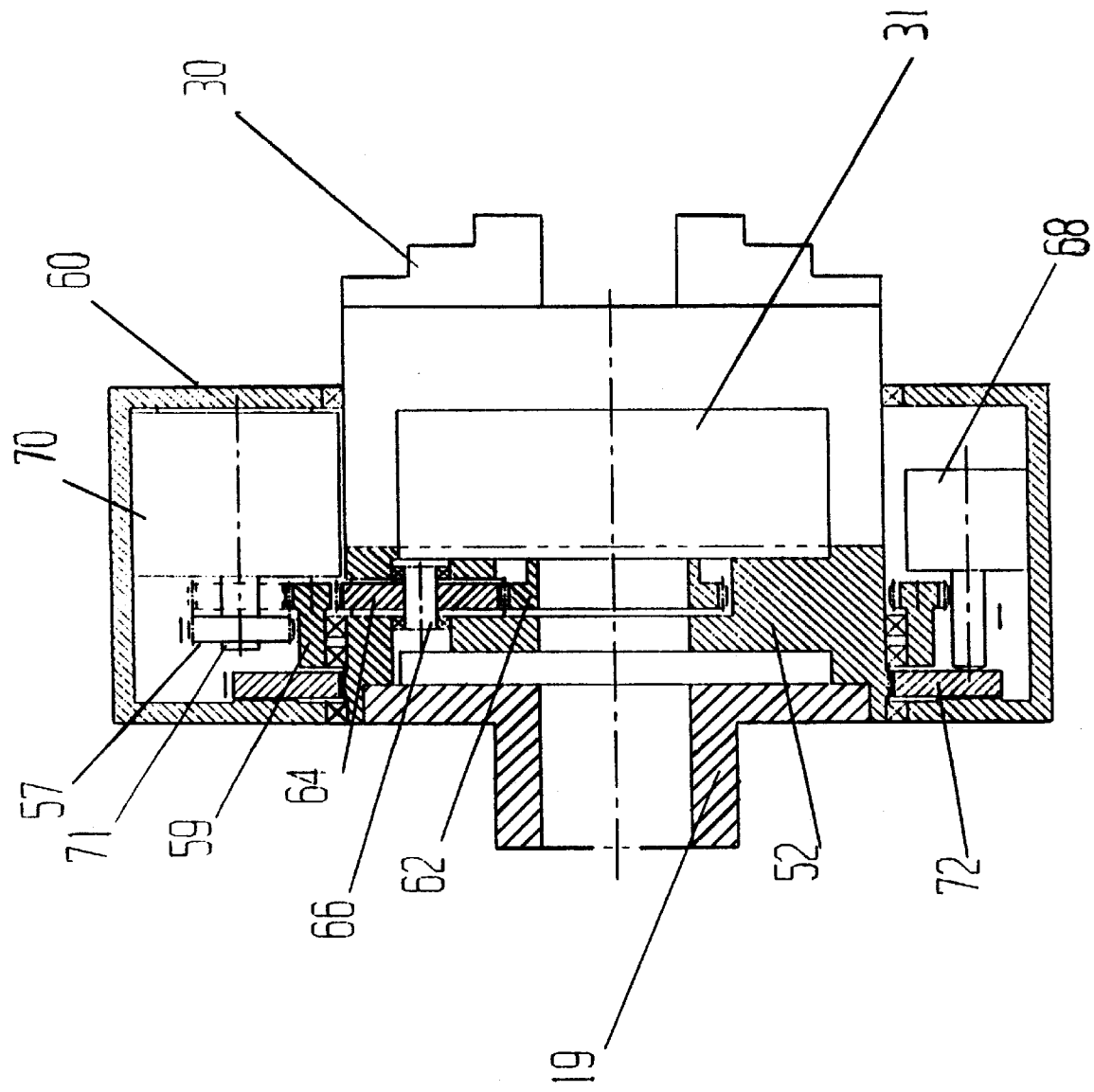
FIG. 7 is a schematic of an embodiment of the inventive power chuck in which a non-hollow motor is disposed externally to the chuck body.

In FIG. 7, another embodiment is shown in which a non-hollow motor 70, having no center-through hole, is disposed outside of chuck body 52, within stationary ring 60. The motor rotor 71 is drivingly and temporarily connected to harmonic drive 31 by means of gear wheels 57, 59, 62, and 64. Gear wheel 57 is supported on the motor rotor 71 and is movable to be directly connected to the motor rotor 56. Gear wheel 62 is attached to wave generator 32 (not shown) of harmonic drive 31, and external gear wheels 64, rotatingly supported to chuck body 52 by means of axle 66, are permanently intermeshed with gear wheel 62. A set of three gear wheels 64 is provided. Gear wheel 59, being a combination internal and external gears, is permanently intermeshed with gear wheels 64.

During jaw adjustment, a solenoid actuation means (not shown), axially moves gear wheel 57, which functionally acts as a clutch, to be in driving contact with gear wheel 59. Solenoid means 68 axially moves disc brake 72 so that stationary ring 60 is connected to chuck body 52. Therefore motor 70 stator is integrally connected with chuck body 52, forming a closed mechanical loop. As motor rotor 71 rotates, gear wheels 57, 59, 62 and 64 are driven, producing jaw 30 movement. During the machining mode, gear wheel 57 and disc brake 72 are detached from gear wheel 59 and stationary ring 60, respectively. Upon operation of the lathe, lathe spindle 19 drives chuck body 52 together with harmonic drive 31 and gear wheels 59, 62 and 64.

Other embodiments are those in which a pneumatic motor or hydraulic motor is employed. These embodiments do not require an electromagnetic brake because the motor stator is permanently connected to the lathe spindle.

Figure 8:
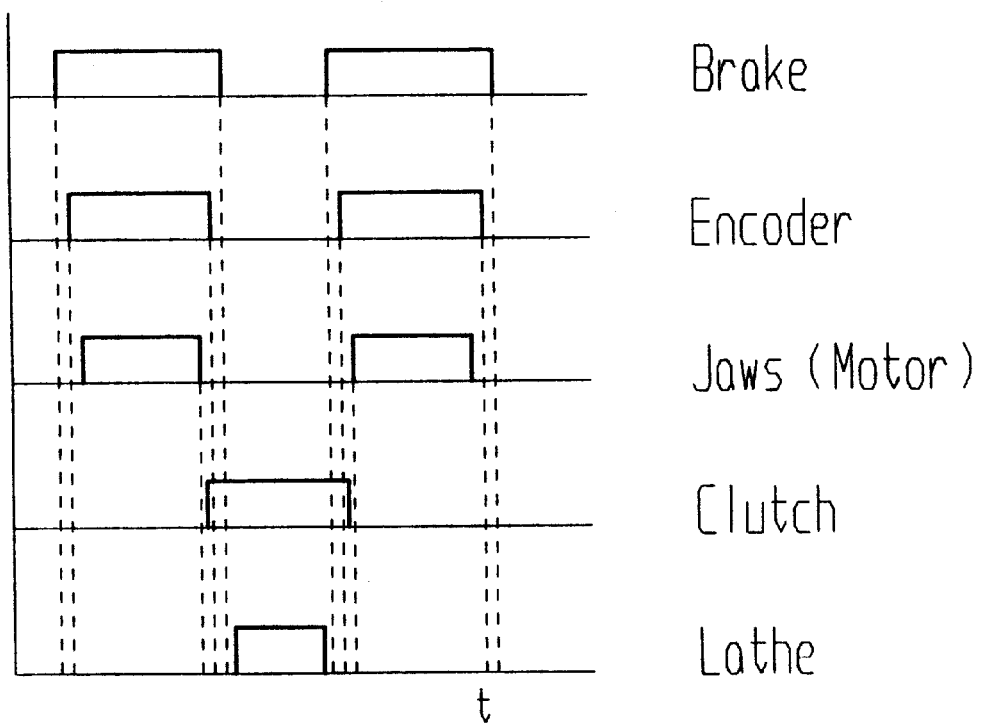
FIG. 8 is an illustration of a typical duty cycle of the alternate operations of the power chuck and lathe.

As shown in FIG. 8, there is illustrated a typical duty cycle of the alternate operations of the power chuck and lathe. Each operation is illustrated by a time interval when it occurs. A control system is programmed in accordance with the duty cycle to optimize efficient and accurate operation of the chuck and lathe, and to control the speed, rotational direction and torque of the rotor 23 and govern the operation of the electromagnetic brake 28, electromagnetic clutch 42 and rotary encoder 44.

During the machining mode, the electromagnetic clutch 42 is energized and it is de-energized in the jaw movement mode. During the jaw movement mode, motor 22, electromagnetic brake 28 and rotary encoder 44 are activated, and deactivated during the machining mode. The rotary encoder 44 is activated only during the jaw movement mode, because only during this mode does the number of motor rotor 23 rotations correspond to jaw movement. The motor rotor 23 will rotate in one rotational direction when the jaws 30 move radially inwards, and will rotate in the opposite direction when the jaws move radially outwards. Electromagnetic clutch 42 is energized during the same time that electromagnetic brake 28 is de-energized, enabling lathe spindle 19 to rotate in a machining operation.

FIG. 9 is a schematic block diagram of control system 84 of the power chuck. The lathe is provided with its own control system 80, when operated under computer numerical control (CNC), and interfaces with a robot control arm 82 which inserts into and removes a workpiece from the inventive chuck.

The power chuck control system 84 comprises a feedback loop in which motor 22 velocity is measured by encoder 44 and read in block 86. Control system 84 also comprises a feedback loop in which the motor torque is measured by motor drive 85 and read in block 86. These values are compared with a threshold value in block 88, and if needed, velocity and torque are adjusted by a command developed in block 90, which is provided to motor drive 85. These feedback loops permit control of the gripping force. Control system 84 also generates commands related to the operation of the electromagnetic brake 28, electromagnetic clutch 42 and encoder 44, as described previously in connection with the duty cycle of FIG. 8, and as described further in connection with the following FIG. 10.

Figure 11:
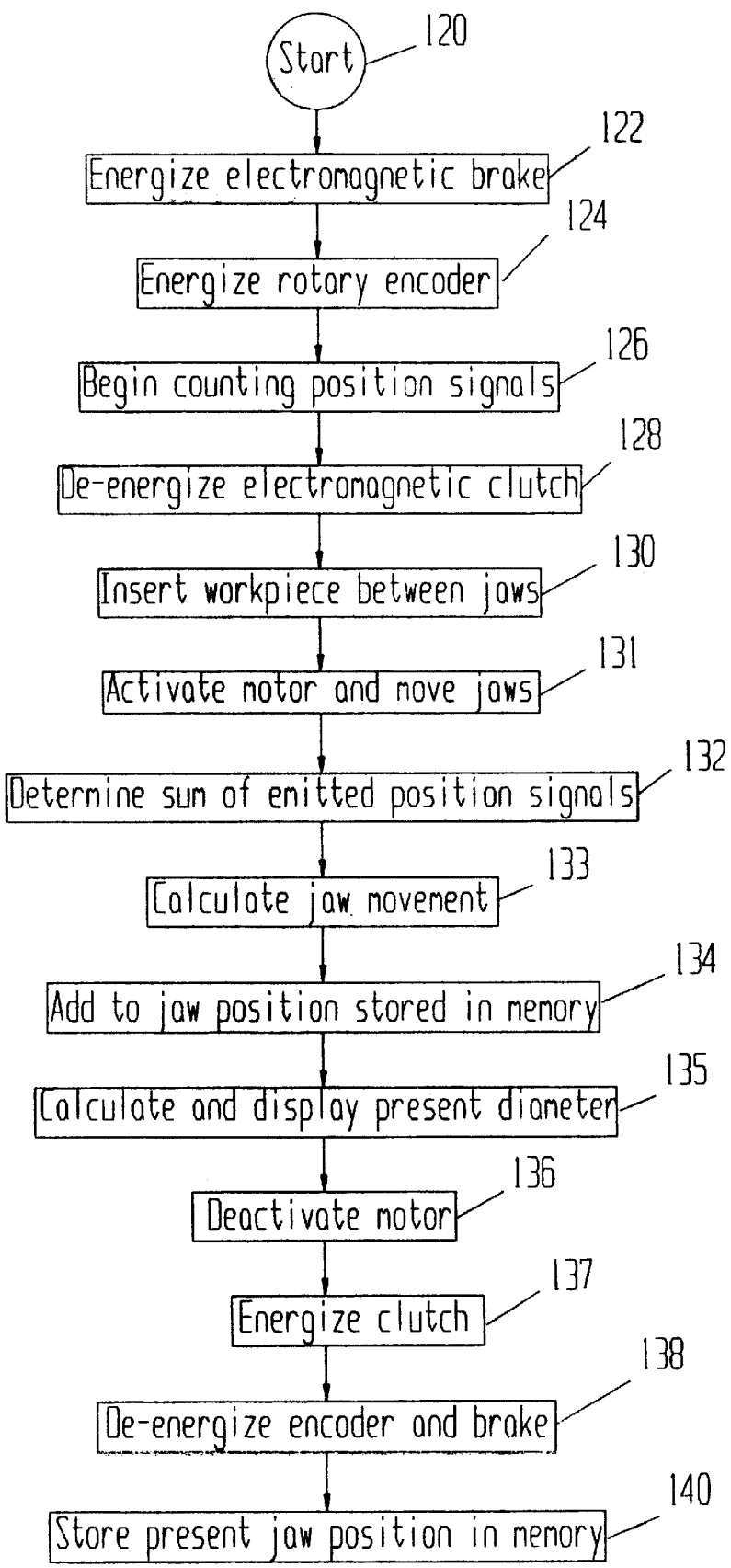
FIG. 11 shows a flowchart for controlling the operation of the chuck system in providing measurement of a workpiece diameter.

Another function of control system 84 is related to the measurement of the jaw position, based on the encoder 44 reading. The encoder reading is provided to block 94, and motor drive 85 continues motor 22 operation until the programmed position is reached. The gripping diameter is calculated at the instant when the programmed motor torque is achieved, as input into block 98. The gripping diameter is stored in memory and displayed in block 95. The gripping diameter is compared with a predetermined value in block 96, to determine if the correct workpiece is used, as defined via input conditions from block 98. If there is a discrepancy between the gripping diameter and the programmed diameter, a warning is displayed to the operator and to the CNC control system 80, if a CNC lathe is used. The flowchart of FIG. 11 shows the sequence of operations to measure the diameter.

The inventive power chuck may be installed on a conventional manually-operated lathe or on a CNC machine. The preferred workpiece diameter may be programmed in accordance with a predetermined work program. Since each type of workpiece material and shape is associated with a particuar gripping force which the jaws must exert on it, optimal working conditions require that the gripping force must be adjustable. This is accomplished in the inventive design by adjusting the motor 22 torque, in the manner depicted in the graphs of FIGS. 12a–b.

The information relating to the gripping force may also be programmed in accordance with a predetermined work program. The measuring and controlling means provide a feedback capability enabling the CNC control system 80 to determine whether the workpiece diameter conforms to the work program and whether it was inserted in the correct position. If one of these tests proves negative, CNC control system 80 will determine whether to prevent lathe operation. This feedback capability enables the lathe operation to be monitored by a robot which is capable of inserting and removing the workpiece, as described above, in accordance with a work program.

In FIG. 10, there is shown an operational schematic diagram of the power chuck in response to a sequence of commands from control system 84. The sequence of commands to grasp a workpiece prior to performing a lathe machining operation is shown with initiation of the sequence in block 100, where the electromagnetic brake 28 is activated. In this block, the motor stator support 25 is connected with spindle 19. Control system 84, after this step, generates a command to CNC control system 80 so that lathe operation is now impossible. In block 102, encoder 44 is activated, to provide feedback signals to control system 84. In block 104, electromagnetic clutch 42 is deactivated, and rotor 23 is detached from spindle 19. In block 106, motor 22 is activated to adjust clamping jaws 30.

After the workpiece has been grasped by the clamping jaws 30, the sequence of commands prior to lathe operation is shown begining with block 107, in which motor 22 is deactivated. Electromagnetic clutch 42 is activated in block 108, so that the rotor 23 is connected with lathe spindle 19. The encoder 44 is deactivated in block 110, to prevent an incorrect workpiece reading. The brake is then deactivated in block 112, so that the motor stator support 25 is detached from the spindle 19. A command is generated in block 116 and transferred to CNC control system 80 so that machining is permitted.

In FIG. 11, there is shown a flowchart for controlling the operation of the chuck system in providing measurement of the workpiece diameter. Before commencement of measurement, the power chuck system is calibrated and the jaw position is stored in memory. Control system 84 calculates any jaw movement and the new jaw position is updated. After start block 120, electromagnetic brake 28 is energized in block 122 to connect motor stator 24 with the machine tool spindle 19 to enable jaw adjustment. In block 124, rotary encoder 44 is energized. In block 126, control system 84 receives and counts the position signals generated by rotary encoder 44. In block 128, the electromagnetic clutch is de-energized releasing motor rotor 23 from machine tool spindle 19. In block 130, the workpiece is inserted in the jaws and the motor is actuated in block 131 for clamping jaw adjustment to grasp the workpiece. In block 132, there is determined the sum of the encoder position signals generated from the instant that rotary encoder 44 is activated until the workpiece is grasped. In block 133, control system 84 calculates the jaw movement based on the sum of encoder position signals that were generated, and in block 134, depending on the rotational direction, this jaw movement is added to, or subtracted from the jaw position previously stored in memory. In block 135, the present diameter measurement is calculated and displayed on a display panel.

The workpiece diameter measurement can be performed by chuck system 10 since the kinematic ratio between the motor rotor 23 and clamping jaws 30 is known. The jaw position is needed to determine the grasping diameter of the workpiece. The CNC computer compares the grasping diameter with the programmed diameter of the workpiece. If there is a discrepancy between the two, the workpiece is either improperly grasped or there is a foreign particle on the workpiece or an incorrect workpiece was selected. The CNC computer, based on the predetermined work program, may reposition the jaws 30 to a specified location, such as to insert a new workpiece with a different gripping diameter. The feedback capabilities of the inventive chuck facilitate the implementation of a robot manipulator 82 to insert and to remove a workpiece.

After the measurement is calculated, a procedure follows for returning the system to operation in the machining mode, and in block 136, the motor is de-activated. In block 137, electromagnetic clutch 42 is energized. In block 138, rotary encoder 44 and electromagnetic brake 28 are de-energized. The present jaw position is calculated in block 140 and stored in memory.

Figure 12A:
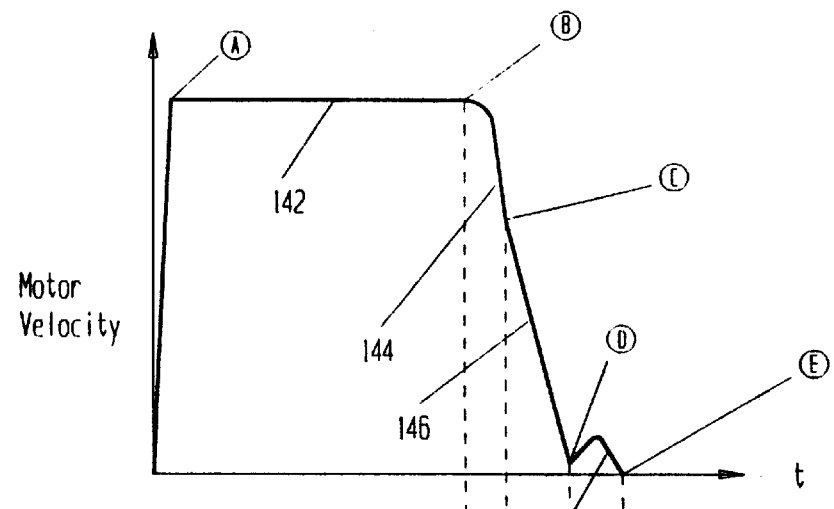
FIG. 12a and FIG. 12b are both graphs of the motor performance during power chuck operation.
Figure 12B:
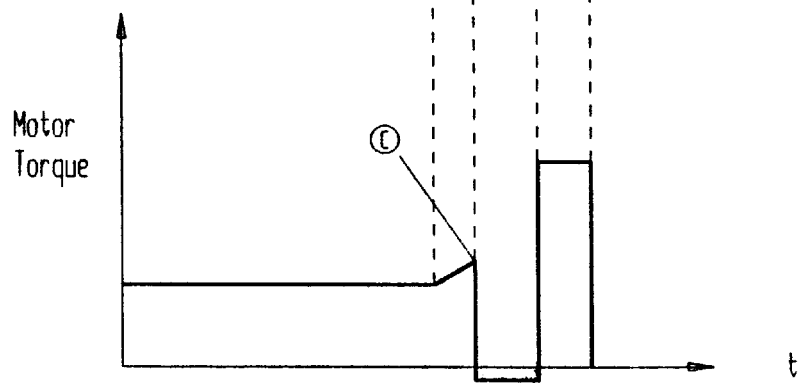

In FIGS. 12a–b, there are shown graphs of the motor performance during power chuck operation, in relation to motor velocity (FIG. 12a) and torque (FIG. 12b). The motor speed drops rapidly as the jaws begin to grasp the workpiece, at which point the motor torque increases slightly. The chuck control system 84 processes the data received from encoder 44, and when the motor speed drops below a preset value or the motor torque increases above a preset value, control system 84 operates to signficantly lower the motor torque. The grasping of the workpiece at this stage continues by means of the inertial forces of the rotating components of the system. The inertial energy drops due to friction. The moment of the inertial forces and the rotor speed drop. The moment of the inertial forces may be additionally lowered by providing an opposing motor torque. Since the moment of the inertial forces is now negligible, an accurate gripping force may now be achieved. The gripping force is now dependent only on the motor torque, and the chuck control system has complete control of the motor torque.

After control system 84 initiates a command to grasp the workpiece, the motor 22 velocity jumps from zero to a point "A" at which maximum velocity is achieved. At this point, motor velocity and torque remain constant (segment 142) while the jaws are being closed on the workpiece. At point "B", the jaws 30 begin to grip the workpiece (segment 144). At point "C", because the motor velocity drops significantly or the motor torque increases above a preset value, control system 84 provides a command to the motor 22 to lower the torque (segment 146). The predominant portion of motor rotations during segment 146 is due to inertial forces. At point "D", the control system 84 provides a command which increases the torque significantly according to a predetermined value, to firmly hold the workpiece during the metal cutting process with a net gripping force in accordance with the input values of block 98. Motor 22 operates at low velocity and at the required torque (segment 148) until the workpiece is completely grasped at point "E". The motor is then deactivated prior to lathe operation, in the sequence depicted in FIGS. 8–10.

The velocity of motor 22 is significantly lowered at point "C" to utilize the effect of the inertial forces. During segment 142 the motor 22 rotates at its maximum velocity. The motor velocity drops during segment 144 as the jaws commence to grasp the workpiece. Without the intervention of control system 84 at point "C", the velocity would continue to decelerate until the workpiece would be completely grasped, producing high inertial forces that may damage workpieces having thin walls or composed of a soft material. The torque of motor is therefore lowered at point "C", and the closing of jaws 30 continues as a result of the inertial forces. Alternatively, the moment of the inertial forces may be additionally lowered by providing an opposing motor torque. At point "D" the inertial forces are negligible, and an accurate gripping force may now be achieved. The gripping force at this point is dependent only on the motor torque, and the chuck control system 84 has complete control over the motor torque. The motor torque is increased to a predetermined level at point "D" so that the sum of the associated gripping force due to the motor torque and to the moment of the residual inertial forces equals the input value of the gripping force at block 98.

At the end of the machining operation, the lathe 12 and electromagnetic clutch 42 are deactivated while the motor 22, together with the other ancillary devices, are activated in the sequence depicted in FIGS. 8 and 10 so that jaws 30 will open to a new position. The workpiece is then removed and another workpiece may now be grasped and machined.

In summary, the inventive power chuck features a compact and hollow chuck design with a variable and controllable gripping force and a high speed and long stroke jaw adjustment having a jaw position measurement feature.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

I claim:

1. An automatic power chuck system, operable in machining and jaw adjustment modes for use in gripping a workpiece on a machine tool spindle, said system comprising:

a power chuck having clamping jaws for gripping the workpiece in adjustable fashion with adjustable gripping force, said clamping jaws being capable of grasping the workpiece and being adjustably mounted and radially displaceable in a chuck body;

a set of teeth integrally formed with said clamping jaws intermeshing with a clamping jaw actuating means rotatingly mounted in said chuck body;

a rotational power source comprising a stator and rotor for driving said clamping jaw actuating means in the jaw adjustment mode via a gear reduction means having an input and output member, said output member of said gear reduction means engaging said clamping jaw actuating means, said rotor being connected to said input member of said gear reduction means, said stator being connected to the machine tool spindle and to said chuck body only during the jaw adjustment mode, and an electromagnetic brake means for releasably connecting said rotational power source rotor with the machine tool spindle to enable jaw adjustment during the jaw adjustment mode, wherein said gear reductions means, said clamping jaw actuating means and said rotor form an integral unit and rotate in unison with the machine tool spindle in the machining mode.

2. The system of claim 1 further comprising:

control means comprising rotary encoder means and processor means, said encoder means being rotatingly connected to said rotational power source rotor with a predetermined kinematic ratio between said rotary encoder means and said clamping jaws, said encoder means providing said processor means with position signals relating to said rotor for controlling the position of said clamping jaws during the jaw adjustment mode, wherein said processor means is operable to calculate the position of said clamping jaws and the speed of said rotational power source in accordance with said encoder means position signals, said clamping jaw position being stored in memory, and wherein said processor means is operable to control said gripping force by adjustment of the rotational torque of said rotational power source in accordance with said predetermined kinematic ratio.

3. The system of claim 2 wherein during the jaw adjustment mode, said processor means controls said gripping force by overcoming the effect of inertial forces developed by rotation of said integral unit, in three successive stages, a first stage associated with initial gripping, a second stage associated with reduced torque, and a third stage associated with final gripping, said first stage obtaining until said processor means indicates a drop in the speed of said rotational power source below a first predetermined value, said second stage obtaining while the torque of said rotational power source is decreased and said gripping force continues to develop due to inertial forces of said rotating integral unit, until said processor means determines the speed of said rotational power source is below a second predetermined value, and said third stage obtaining while increasing the torque of said rotational power source so that the gripping force is equivalent to a pre-programmed value.

4. The system of claim 2 wherein during the jaw adjustment mode, said processor means controls said gripping force by overcoming the effect of inertial forces developed by rotation of said integral unit, in three successive stages, a first stage associated with initial gripping, a second stage associated with reduced torque, and a third stage associated with final gripping, said first stage obtaining until the torque of said rotational power source increases above a first predetermined value, said second stage obtaining while the torque of said rotational power source is decreased and said gripping force continues to develop due to inertial forces of said rotating integral unit, until a predetermined time interval has elapsed, and said third stage obtaining while increasing the torque of said rotational power source so that the gripping force is equivalent to a pre-programmed value.

5. The system of claim 1 wherein said gear reduction means has a minimum gear ratio of approximately 80, an outer diameter less than that of said chuck body, and an axial length less than that of said chuck body.

6. The system of claim 1 wherein said gear reduction means has a minimum gear ratio of approximately 80, an outer diameter less than that of said chuck body, an inner diameter greater than that of the machine tool spindle, and an axial length less than that of said chuck body.

7. The system of claim 6 wherein said gear reduction means has an outer diameter less than 170 mm, and an axial length less than 55 mm, said outer diameter of said gear reduction means being proportionally related to a chuck body having an outer diameter of 200 mm, said axial length of said gear reduction means being proportionally related to an axial length of said chuck body, with said rotational power source having an inner diameter greater than that of the machine tool spindle.

8. The system of claim 2 further comprising an electromagnetic clutch means for releasably connecting said rotational power source rotor with the machine tool spindle to prevent inadverent jaw adjustment during the machining mode.

9. The system of claim 1 wherein said rotational power source is disposed outside of said chuck body, said rotational power source rotor being connected to said gear reduction means only during the jaw adjustment mode.

10. The system of claim 1 wherein said rotational power source encompasses the periphery of said chuck body, said rotational power source rotor being permanently connected to said input member of said gear reduction means via gear wheels.

11. The system of claim 1 wherein said gear reduction means is disposed outside of said chuck body.

12. The system of claim 1 wherein said gear reduction means is disposed inside of said chuck body.

13. The system of claim 1 wherein said rotational power source is an electric motor.

14. The system of claim 1 wherein said rotational power source is a hydraulic motor, said rotating integral unit including both said stator and rotor of said hydraulic motor.

15. The system of claim 1 wherein said rotational power source is a pneumatic motor, said rotating integral unit including both said stator and rotor of said pneumatic motor.

16. A method for measuring a diameter of a workpiece by operating said control means in the system of claim 8, said method comprising the steps of:

energizing said electromagnetic brake means to connect said rotational power source stator with the machine tool spindle to enable jaw adjustment;

activating said rotary encoder means to emit position signals for processing by said processor means to calculate the position of said clamping jaws;

de-energizing said electromagnetic clutch means releasing said rotational power source rotor from the machine tool spindle;

inserting the workpiece between said clamping jaws;

actuating said rotational power source to adjust said clamping jaws to grasp the workpiece;

counting the sum of said encoder position signals that were emitted beginning with said rotary encoder activating step, until the workpiece is grasped;

calculating in said processor means, from said sum of encoder position signals, jaw movement;

adding said jaw movement in said processor means to said stored clamping jaw position;

calculating a diameter measurement with a predetermined error tolerance; and displaying, on a display panel, said diameter measurement.

17. The method of claim 16 wherein said displaying step is followed by a procedure for returning said system to operation in the machining mode, said procedure comprising the steps of:

de-actuating said rotational power source;

energizing said electromagnetic clutch means to connect said rotational power source rotor to the machine tool spindle;

deactivating said rotary encoder means;

de-energizing said electromagnetic brake means to disconnect said rotational power source stator from the machine tool spindle to prevent jaw adjustment; and storing in said processor means the position of said clamping jaws.

18. In a method for measuring the workpiece diameter in accordance with claim 17, a method for generating a warning to a machine tool operator if said clamping jaws are in an incorrect gripping position, said method comprising the steps of:

a) programming a daily work schedule including a predetermined number of workpieces for machining each of which has a known diameter;

b) establishing a predetermined order of machining the workpieces;

c) selecting a workpiece in accordance with said programmed work schedule;

d) measuring the workpiece diameter in accordance with said workpiece diameter measuring method;

e) comparing, in said processor means, said calculated diameter measurement and said programmed workpiece diameter;

f) determining if there exists a discrepancy greater than said predetermined error tolerance, between said calculated and programmed diameter measurements, and proceeding to step (i) if no discrepancy exists, otherwise, g) generating a warning to the operator;

h) verifying that the selected workpiece matches the programmed workpiece, and if not, re-aligning the workpiece in said clamping jaws as needed and returning to step (f), otherwise proceeding to step (c) to replace the workpiece; and i) restoring the system to operation in the machining mode.

19. The method of system 18 wherein the step of restoring said system to operation in the machining mode comprises the steps of:

de-actuating said rotational power source;

energizing said electromagnetic clutch means to connect said rotational power source rotor to the machine tool spindle;

deactivating said rotary encoder means;

de-energizing said electromagnetic brake means to disconnect said rotational power source stator from the machine tool spindle to prevent jaw adjustment; and storing in said processor means the position of said clamping jaws.

20. The method of claim 17 for machining a workpiece with at least two gripping positions, wherein the machine tool is a CNC-type whose operation is supervised by an operator, said method comprising the steps of:

a) commencing metal cutting in the machining mode;

b) deactivating the machine tool upon completion of a selected metal cutting set-up;

c) energizing said electromagnetic brake means;

d) energizing said rotary encoder means;

e) de-energizing said electromagnetic clutch means;

f) actuating said rotational power source to adjust said clamping jaws to a position corresponding to a new gripping position;

g) repositioning the workpiece by operator intervention;

h) actuating said rotational power source to adjust said clamping jaws to grasp the workpiece;

i) determining the sum of said encoder position signals that were emitted during steps (d) until (h);

j) calculating in said processor means, from said sum of encoder position signals, a jaw movement;

k) adding said calculated jaw movement to said stored clamping jaw position;

l) calculating in said processor means, a diameter measurement with a predetermined error tolerance;

m) displaying, on a display panel, said calculated diameter measurement;

n) performing said procedure of restoring said system to operation in the machining mode;

o) performing steps (a) and (b);

p) proceeding to step (r) if no additional machining is to be performed;

q) performing steps (c) to (o) if additional machining is to be performed;

r) performing steps (c) to (e);

s) actuating said rotational power source to adjust said clamping jaws to a position facilitating workpiece removal;

t) removing the workpiece from said clamping jaws; and u) proceeding to the next workpiece in accordance with said daily work schedule.

21. The method of claim 20 wherein the system further comprises a robot for performing the steps of:

inserting the workpiece in said clamping jaws at the appropriate stage in said programmed daily work schedule;

replacing the workpiece in accordance with the results of said diameter discrepancy determination step;

adjusting the gripping position of the workpiece; and removing the workpiece from said clamping jaws.

22. An automatic power chuck system, operable in machining and jaw adjustment modes for use in gripping a workpiece on a machine tool spindle, said system comprising:

a power chuck having clamping jaws for gripping the workpiece in adjustable fashion with adjustable gripping force, said clamping jaws being being capable of grasping a workpiece and being adjustably mounted and radially displaceable in a chuck body;

a set of teeth integrally formed with said clamping jaws intermeshing with a clamping jaw actuating means rotatingly mounted in said chuck body, a rotational power source comprising a stator and rotor for driving said clamping jaw actuating means in the jaw adjustment mode via a gear reduction means having an input and output member, said output member of said gear reduction means engaging said clamping jaw actuating means, said rotor being connected to said input member of said gear reduction means, said stator being connected to the machine tool spindle and said chuck body only during the jaw adjustment mode, wherein said gear reduction means, said clamping jaw actuating means and said rotor form an integral unit and rotate in unison with said machine tool spindle in the machining mode; and control means comprising rotary encoder means and processor means, said encoder means being rotatingly connected to said rotational power source rotor with a predetermined kinematic ratio between said rotary encoder means and said clamping jaws, said encoder means providing said processor means with position signals relating to said rotor for controlling the position of said clamping jaws during the jaw adjustment mode, wherein said processor means is operable to calculate the position of said clamping jaws and the speed of said rotational power source in accordance with said encoder means position signals, and wherein said processor means is operable to control said gripping force by adjustment of the rotational torque of said rotational power source in accordance with said predetermined kinematic ratio.

* * * * *